United States Patent
Lay

(10) Patent No.: US 7,837,538 B2
(45) Date of Patent: Nov. 23, 2010

(54) BLADE AND CONNECTION SLEEVE OF A KNIFE FOR AN APPARATUS FOR CUTTING OFF THE RECTUM OF A SLAUGHTERED ANIMAL

(75) Inventor: Norbert Lay, Bondorf (DE)

(73) Assignee: Schmid & Wezel GmbH & Co., Maulbronn (DE)

( * ) Notice: Subject to any disclaimer, the term of this patent is extended or adjusted under 35 U.S.C. 154(b) by 315 days.

(21) Appl. No.: 11/989,692

(22) PCT Filed: May 30, 2006

(86) PCT No.: PCT/EP2006/005127

§ 371 (c)(1),
(2), (4) Date: Jan. 30, 2008

(87) PCT Pub. No.: WO2007/014587

PCT Pub. Date: Feb. 8, 2007

(65) Prior Publication Data
US 2009/0093205 A1    Apr. 9, 2009

(30) Foreign Application Priority Data
Aug. 2, 2005    (DE) .................. 20 2005 012 122 U

(51) Int. Cl.
A22C 21/06    (2006.01)
(52) U.S. Cl. .................................... 452/122

(58) Field of Classification Search .................. 452/106, 452/119, 120, 122
See application file for complete search history.

(56) References Cited

U.S. PATENT DOCUMENTS

| | | | | |
|---|---|---|---|---|
| 3,786,535 A | * | 1/1974 | La Barber | 452/116 |
| 3,921,255 A | * | 11/1975 | LaBarber | 452/109 |
| 4,023,237 A | | 5/1977 | Meyn | |
| 5,141,471 A | * | 8/1992 | Bekkers | 452/122 |
| 5,199,922 A | * | 4/1993 | Korenberg et al. | 452/122 |
| 5,419,738 A | | 5/1995 | Lysbo | |
| 6,210,263 B1 | * | 4/2001 | Meyer | 452/120 |
| 6,641,475 B1 | | 11/2003 | Nielsen | |
| 7,264,543 B2 | * | 9/2007 | Lay | 452/122 |

FOREIGN PATENT DOCUMENTS

| | | |
|---|---|---|
| DE | 23 13 092 | 9/1973 |
| DE | 202004 019195 | 4/2005 |
| EP | 0 492 735 | 7/1992 |
| EP | 1 354 517 | 10/2003 |

* cited by examiner

Primary Examiner—Thomas Price
(74) Attorney, Agent, or Firm—Paul Vincent

(57) ABSTRACT

Blade for a knife of an apparatus for cutting off the rectum of slaughtered animals, wherein the ground section of the hollow cylindrical blade (11) is at a specific angle to the cutting edge (20) at the cutting edge of said hollow-cylindrical blade. The blade (11) is ground over a short portion (A) of its length with a first angle ($\alpha$) and then in the axial direction on this portion with a second angle ($\beta$) which is smaller than the first-mentioned angle ($\alpha$).

9 Claims, 2 Drawing Sheets

BLADE AND CONNECTION SLEEVE OF A KNIFE FOR AN APPARATUS FOR CUTTING OFF THE RECTUM OF A SLAUGHTERED ANIMAL

This application is the national stage of PCT/EP2006/005127 filed on May 30, 2006 and also claims Paris Convention priority to DE 20 2005 012 122.3 filed Aug. 2, 2005.

BACKGROUND OF THE INVENTION

The invention concerns a blade and a connection sleeve bearing the blade of the type mentioned in the pre-characterizing part of claims 1 and 8, respectively. These are disclosed (DE 20 2004 019 195 U1; DE 2313 092 A1; U.S. Pat. No. 5,4119,738 A; U.S. Pat. No. 6,641,475 B1; U.S. Pat. No. 4,023,237; EP 1 354 517 A1).

It is the underlying purpose of the invention to improve this blade and the connection sleeve bearing it in such a fashion that blade wear during operation is reduced, thereby increasing the service life.

In accordance with the invention, this is achieved with the features of the independent claim. The dependent claims define advantageous further developments.

SUMMARY OF THE INVENTION

The design of this blade and of the connection sleeve bearing it increases the service life of the blade from approximately 1,500 cuts to now approximately 15,000 cuts, i.e. by approximately 10 times.

The connection sleeve contributes to this fact in that its inventive design reduces the imbalance during rotation and thereby the imbalance of the system blade/connection sleeve. The imbalance of prior art devices is due to fixation to the hollow shaft of the device with three screws around the periphery (DE '195, reference numeral 55).

One embodiment of the invention and its advantageous further developments are described in more detail below with reference to the attached drawings.

DESCRIPTION OF THE PREFERRED EMBODIMENT

Figure 1:
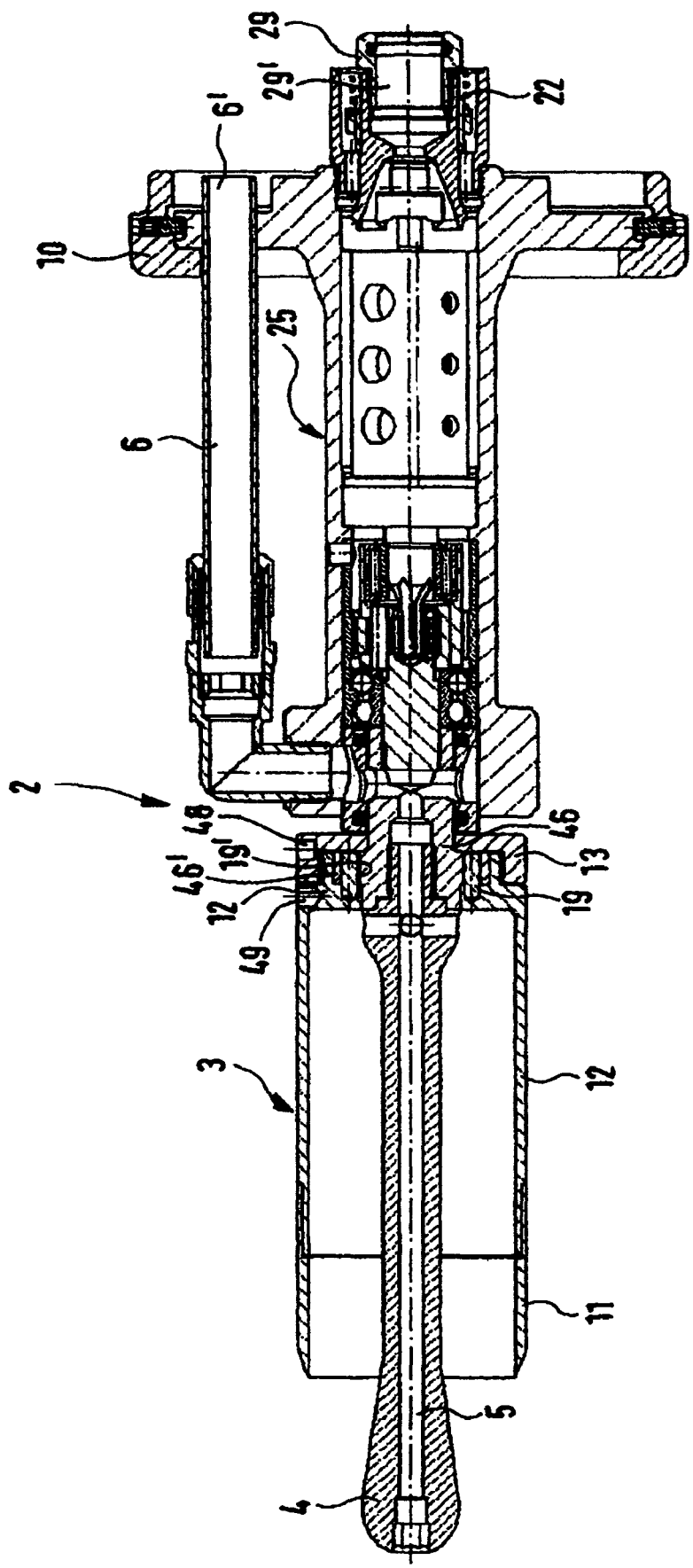
FIG. 1 shows a cross-section through the above-mentioned device with a knife 3 that consists of a blade 11 and a connection sleeve 12 in accordance with one embodiment of the invention.

FIG. 1 shows a device 2 for cutting off the rectum of slaughtered animals. This device is used to release the rectum from the surrounding tissue when the slaughtered animal is cut into two halves. Towards this end, a guiding spike 4 is inserted into the rectum and rotated by a motor 25 that is operated by air pressure. The hollow-cylindrical blade 11 is guided along the thighbone and the backbone of the slaughtered animal. A suction line 5 is provided inside the guiding spike 4 to suction and retain the rectum in order to extract the remaining bowel contents (excrement) via the vacuum connection tube 6. Cutting off is effected at the same time. Through cutting off, the bowel packet can be removed as a whole from the body of the slaughtered animal along the separating cut during subsequent division of the slaughtered animal by cutting open the abdominal wall (also compare EP 0 594 791 and AU 573 603 A).

The device 2 is screwed to a robot connection plate (not shown) using a union nut 10. It has one outlet opening for vacuum (for suctioning), one for water (for rinsing), one for compressed air (for driving the motor 25) and one for discharging the exhaust air of the motor (compare the above-mentioned document DE '195).

As described up to now, FIG. 1 shows the prior art already described in 20 2004 019 195 U1, the full disclosure of which is hereby incorporated by reference.

Figure 2A:
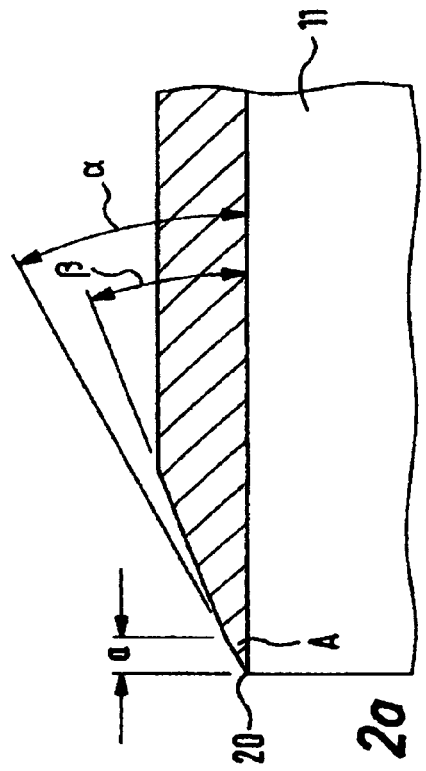
FIG. 2a shows the detail 11a of FIG. 2 in an enlarged scale.
Figure 2:
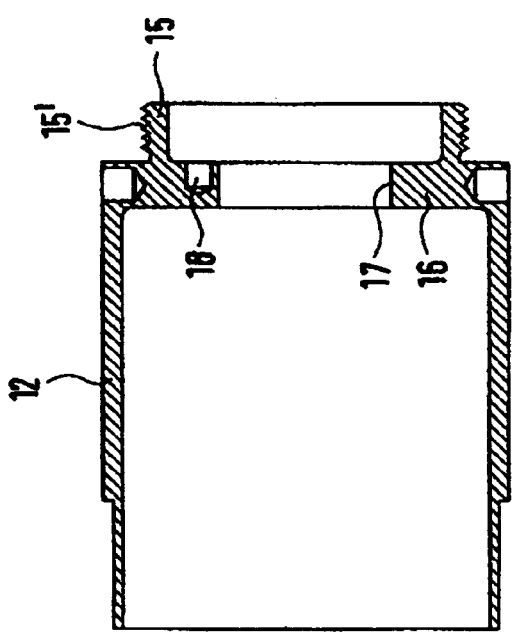
FIG. 2 shows the blade 11.
Figure 3:
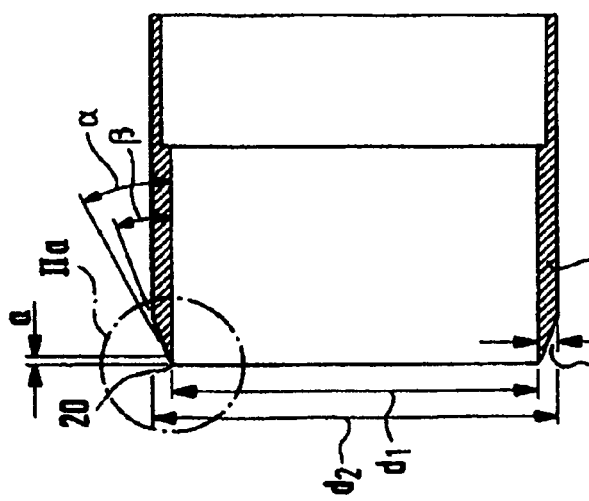
FIG. 3 shows the connection sleeve 12.

As can be gathered from FIG. 1, the hollow-cylindrical knife 3 consists of a hollow-cylindrical blade 11 (see FIGS. 2 and 2a) and a likewise hollow-cylindrical connection sleeve 12 (FIG. 3). These two elements are glued to each other (FIG. 1). The blade 11 is ground, starting from its cutting edge 20 along a length portion A through a length a=1.5 mm at first at an angle of α=27° followed by a section that is ground at an angle of β=20°. The inner diameter $d_1$ of the blade 11 is 54 mm, the outer diameter $d_2$ is 60 mm. The wall thickness s is 3 mm. The ranges stated in the claims have all proven to be clearly advantageous. The dimensions stated herein are particularly favorable.

The effect that is considerably improved compared to prior art is based on the fact that the blade that is initially ground at an angle of 27° is ground sharply enough to provide good cutting and on the other hand, the angle is blunt enough to exert a sufficiently high pressure onto the surroundings of the cut. The subsequent grinding angle of 20° permits a certain amount of relaxation of the cut material, directly following the cut.

The connection sleeve 12 bears the blade 11 and is used for connection to the hollow shaft 46 driven by the motor 25 (compare FIG. 1). The motor 25 is operated by compressed air which is supplied from the robot connection plate (not shown) to the chamber 29' in the connection sleeve 29.

The connection sleeve 12 has a cylindrical collar 15 whose outer diameter is slightly offset from the diameter of the connection sleeve 12 and is therefore slightly smaller. The collar 15 has an outer thread 15' that is screwed to a union nut 13 for connection to the hollow shaft 46 of the device 2.

The front face 16 of the connection sleeve 12 has an opening 17 radially inside the collar 15 for passage of the guiding spike 5. The front face 16 moreover has three bores 18 designed as blind holes, which are distributed about its periphery, only one of which is shown in FIG. 3. Carrier pins 19 are clamped in these bores 18, which project into associated and correspondingly arranged holes 19' in a flange 46' of the hollow shaft 46 during assembly of the device (FIG. 1), thereby guaranteeing that the hollow shaft 46 and the guiding spike 5 are connected for secure mutual rotation with each other.

The bores 48 and 49 are used to insert a wrench in order to fasten or unfasten the screw connection between the union nut 13 and the connection sleeve 12.

I claim:

1. A blade for a knife of a device for cutting off the rectum of slaughtered animals, the blade comprising:
   a hollow, cylindrical blade body, said blade body having an inner wall and an outer wall, said inner and outer walls being substantially parallel to each other;
   a first ground region extending from a cutting edge of said blade body at said inner wall, towards said outer wall, said first ground region enclosing a first angle with respect to said inner wall; and a second ground region contiguous to said first ground region and extending from an end of said first ground region up to said outer wall, said second ground region enclosing a second angle with respect to said inner wall, wherein said second angle is smaller that said first angle.

2. The blade of claim 1, wherein said second angle is between 18° and 22°.

3. The blade of claim 1, wherein an axial length of said first ground region is approximately 1.5 mm.

4. The blade of claim 1, wherein said first angle is 27°.

5. The blade of claim 1, wherein said second angle is 20°.

6. The blade of claim 1, wherein said blade body has a wall thickness of approximately 3 mm, proximate said second ground region.

7. The blade of claim 6, wherein said blade body has an outer diameter of approximately 60 mm and an inner diameter of approximately 54 mm.

8. A connection sleeve connected to the blade of claim 1, wherein the connection sleeve has a collar for connection to the device, said collar having a thread on an outer side thereof.

9. The connection sleeve of claim 8, wherein the connection sleeve has carrier pins within said collar, an other part thereof being disposed on a flange of a rotary driven hollow shaft and structured for engagement with a corresponding part.

* * * * *